United States Patent [19]

Mackay

[11] Patent Number: 5,490,453
[45] Date of Patent: Feb. 13, 1996

[54] CENTRIFUGAL FAT EXTRACTION APPARATUS

[75] Inventor: Spencer L. Mackay, North Hollywood, Calif.

[73] Assignee: SAS TV Products, Inc., Tarrytown, N.Y.

[21] Appl. No.: 370,180

[22] Filed: Jan. 9, 1995

[51] Int. Cl.$^6$ .................. A47J 43/04; B01D 33/00; F26B 17/24
[52] U.S. Cl. .................. 99/495; 34/58; 99/511; 99/513; 210/369; 210/379; 210/360.1; 210/380.1; 494/36; 494/56
[58] Field of Search .................. 99/403, 407–415, 99/352, 353, 495, 510–513, 484; 34/58; 210/360.1, 380.1, 474, 369, 477, 379; 241/168, 169, 169.1; 134/157, 158, 162; 366/232, 234; 494/36, 43, 56, 58, 60, 83, 84, 11

[56] References Cited

U.S. PATENT DOCUMENTS

| | | | |
|---|---|---|---|
| 2,302,138 | 11/1942 | Nicholson | 146/76 |
| 3,200,737 | 8/1965 | Ferenc | 99/355 |
| 3,396,656 | 8/1968 | Forkner | 99/407 |
| 3,434,410 | 3/1969 | Galle | 99/246 |
| 3,659,550 | 5/1972 | Fulton | 118/6 |
| 3,718,485 | 2/1973 | Lankford | 99/204 |
| 4,006,260 | 2/1977 | Webb et al. | 426/438 |
| 4,160,445 | 7/1979 | Kunz | 126/369 |
| 4,189,850 | 2/1980 | Dietrich et al. | 494/11 |
| 4,242,365 | 12/1980 | Numata et al. | 426/438 |
| 4,273,033 | 6/1981 | Hice | 99/349 |
| 4,517,082 | 5/1985 | Prudhomme | 210/217 |
| 4,591,434 | 5/1986 | Prudhomme | 210/117 |
| 4,702,162 | 10/1987 | Sontheimer et al. | 99/495 |
| 4,838,317 | 7/1989 | Prudhomme et al. | 126/391 |
| 4,857,347 | 8/1989 | Webb | 426/438 |
| 4,873,920 | 10/1989 | Yang | 99/409 |
| 4,901,633 | 2/1990 | De Longhi | 99/409 |
| 5,027,697 | 7/1991 | De Longhi | 99/409 |
| 5,065,672 | 11/1991 | Federighi, Sr. | 99/631 |
| 5,101,805 | 4/1992 | Ferrara | 99/353 |
| 5,168,797 | 12/1992 | Wang | 99/342 |
| 5,176,825 | 1/1993 | Hadjis et al. | 210/170 |
| 5,223,137 | 6/1993 | Hattori et al. | 210/368 |
| 5,230,281 | 7/1993 | Wierman et al. | 99/483 |

FOREIGN PATENT DOCUMENTS 02286066  4/1989  Japan.

*Primary Examiner*—Timothy F. Simone
*Attorney, Agent, or Firm*—Cislo & Thomas

[57] ABSTRACT

An improved centrifugal fat extraction apparatus for removing surface liquid from food which comprises a housing assembly having mounted at its bottom a self-centering drive assembly having a shaft extending vertically from the self-centering drive assembly within the housing assembly, a rotatable spindle mounted onto the shaft, a means for rotating the spindle at a variable speed between 750 and 1200 rpm for approximately a 45 second time span, and a rotatable cylindrical slotted basket capable of holding foods. The self-centering drive assembly prevents undesirable vibration from being imparted to the housing assembly as the result of eccentric loading of the foods into the slotted basket.

20 Claims, 6 Drawing Sheets

CENTRIFUGAL FAT EXTRACTION APPARATUS

BACKGROUND OF THE INVENTION

The present invention relates generally to food processing equipment of the type used to extract the fat content from fried foods. More particularly, the invention relates to a centrifugal separating apparatus which is particularly suitable for use in removing the surface liquid from food products.

Various types of centrifuge devices currently exist in the art, the object being to provide a means to remove the cooking oil from the surface of the food once a frying operation has been completed. However, these types of prior art centrifuge devices are mainly for use in manufacturing of frozen food products and are typically large in size being prohibitively expensive and not desirable for home use.

Additionally, it is known in the art that devices for removing excess oils from cooked food products include methods that utilize pressurized containers and vacuum chambers in association with high temperatures before the centrifuge process begins, all of which are once again not readily adaptable for use in the consumer's home.

Thus, there is a need for a centrifugal extraction device for removing the surface liquids from household food products which is simple and economical in use and allows for the efficient separation of liquids from solids in a small compact design which can be used at the consumer's home and is easy to clean and store after use.

The subject invention herein solves all of these problems in a new and unique manner which has not been part of the art previously. General types of centrifuge devices for removing the fat content from fried foods are known in the art and some related patents are described below:

U.S. Pat. No. 5,168,797 issued to Y. Wang on Dec. 8, 1992

This patent describes a reciprocally vacuumized and pressurized multipurpose food processing apparatus in which all kinds of to be processed food can be received into a basket that can be moved in an up and down manner by a pneumatically operated cylinder and may be continually rotated in one direction for stirring purposes via a motor making the soakage of foods therein even. The soaked food is then fried with oil with the basket containing the fried food simultaneously being moved up and down and turned continually under a vacuum state after which the fried food is de-oiled via a centrifuge.

U.S. Pat. No. 4,857,347 issued to W. Webb on Aug. 15, 1989

This patent is directed to a method of dehydrating and puffing food particles which includes the removing of excess oil by a centrifuge technique in which a plurality of trays that hold the food particles are spun at high speeds of rotation. The method and apparatus further includes a multiple unit system comprising pressure vessels that are fitted with the aforementioned trays and arranged to receive a procession of prepared food products wherein after preparation of the food products they are delivered to a packaging machine to be sealed in moisture barrier packages.

U.S. Pat. No. 4,006,260 issued to W. Webb, et al. on Feb 1, 1977

This patent is directed to a method and apparatus for evaporation of moisture from fruit and vegetable particles by using a combination of decreasing pressure and increasing temperature thereby dehydrating the food particles. After the dehydration process of the food particles is completed, they are cooled by contact with cool oil to fix them in a puffed condition wherein the oil is then removed from contact with the particles by use of a centrifuge. The finished food particles are then removed from the centrifuge and restored to atmospheric condition.

U.S. Pat No. 5,223,137 issued to R.Hattori, et al. on Jun. 29, 1993

This patent is directed to a centrifuge separation apparatus which is particularly suitable for use in separating frying oil from foodstuffs. The centrifuge separation apparatus comprises a rotatable cylindrical member including a side perforated wall and an open bottom and a bottom lid member including a central raised portion in a side wall inclined downwardly and outwardly. Food to be centrifugally treated are accumulated in the lower portion of the space defined by the inner wall of the rotatable cylindrical member and the side inclined wall of the bottom lid member.

U.S. Pat No. 5,176,825 issued to D. Hadjis et al on Jan. 25, 1993

This patent is directed to a system that includes a centrifuge spin drum for removal of a liquid component from a solid component in food waste and garbage. The invention provides a spinning perforated drum with an internal filter bag through which liquid and fine solids pass by centrifugal force. The separated liquid is then filtered through a finer filter to make the water acceptable for a municipal sewer disposal system.

U.S. Pat No. 5,065,672 issued to G. Federighi, Sr. on Nov. 19, 1991

This patent is directed to a motor driven apparatus for peeling food products and has a housing forming a processing chamber in an abrasive rotary disc in the chamber which abrades the skin or husk from the product. A movable gate partially obstructs a discharge slot at the side of the chamber. The gate is raised at the end of each peeling operation enabling the centrifugal ejection of the product by a rotary motion of the disc. Manual unloading and separation of the peelings and product is unnecessary thereby providing for fast, high throughput operations.

U.S. Pat No. 4,160,445 issued to P. Kunz on Jul. 10, 1979

This patent is directed to a method and pressure vessel for cooking food. The pressure vessel is divided into two zones one of which receives the food to be cooked and the other of which receives a predetermined quantity of liquid. The pressure vessel is periodically pivoted during cooking with saturated steam and due to the pivotal or rotational movement the liquid passes periodically from one zone to the other thus wetting the food retained therein and then back into the other zone.

U.S. Pat No. 4,901,633 issued to G. DeLonghi on Feb. 20, 1990

This patent is directed to a deep fryer apparatus suitable for home use which includes a rotatable basket which rotates within a tray. The axis of rotation of the basket is greatly inclined with respect to an oil bath contained in the tray, so that the food contained in the basket is cyclically and progressively immersed in the oil bath. The bath is heated by heaters and the apparatus is monitored by control devices wherein only a small quantity of oil is needed to form the oil bath, approximately one-half what is generally necessary.

SUMMARY OF THE INVENTION

The present invention is directed to an improved centrifugal fat extraction apparatus for removing surface liquid from food which comprises a housing assembly having mounted at its top and bottom end a self-centering drive assembly having a shaft extending vertically from the self-centering drive assembly within the housing assembly, a rotatable spindle mounted onto the shaft, a means for rotating the spindle at a speed between 750 and 1200 rpm for approximately a 45 second time span, and a rotatable cylindrical slotted basket capable of holding foods. The self-centering drive assembly prevents undesirable vibration from being imparted to the housing assembly as the result of eccentric loading of the foods into the cylindrical slotted basket.

The cylindrical slotted basket comprises a horizontally disposed circular bottom piece and two to four, but ideally three interconnected vertically disposed cylindrical portions of decreasing diameter each defining vertical slots wherein the bottom portion is attached at a lower open end to the outer edge of the circular bottom piece to form the vertical wall of the slotted basket. The width of the slots of the three vertically disposed cylindrical portions must be sufficiently wide to permit surface liquid from the food to pass through it readily. The cylindrical slotted basket is vertically connectible to and removable from the rotatable spindle.

The centrifugal fat extraction apparatus also includes a drum for catching and retaining the removed surface liquid during operation. The drum comprises a solid vertical wall surrounding the vertical wall of the cylindrical slotted basket. The solid vertical wall has an annular channel on the inside of its outer lower edge and defines a substantially J-shaped cross section at the outer lower edge. The solid vertical wall is vertically mountable within the housing assembly and directly mountable on and removable from the self-centering drive assembly.

The height of the vertical wall of the drum is greater than the height of the outer wall of the housing assembly and therefore protrudes above and completely surrounds and encases the vertical wall of the cylindrical slotted basket. In addition, the apparatus comprises a transparent removable cover for closing the upper open end of the protruding solid vertical wall of the drum and mounts onto an upper rim of the housing assembly thereby enclosing the cylindrical slotted basket within the housing assembly. By applying a small downward force to the transparent removable cover, the cover actuates a switch means in the housing assembly thereby activating the means for rotating the spindle which in turn rotates the cylindrical slotted basket.

The self-centering drive assembly of the centrifugal fat extraction apparatus comprises a motor support plate member housed between a circular bearing plate member and cup shaped base member. A drive motor is mounted within the motor support plate member and engages and drives the spindle during operation. The motor support plate member is housed between the circular bearing plate member and the cup shaped base member by a plurality of springs and moves along the surface of a plurality of up-raised portions on the floor surface of the cup shaped base member. In operation, the springs allow the drive motor in association with the motor support plate member to laterally deflect as a result of eccentric loading of the foods into the cylindrical slotted basket which prevents undesirable vibration from being imparted to the housing assembly.

Accordingly it is an object of the present invention to provide an apparatus of the above character which will withstand the vibrational forces incident to the operation of centrifuge.

It is another object of the invention to provide an economical stand alone unit for home use that extracts the surface liquid from foods.

A further object of the invention is to provide an apparatus which reduces the fat content of fried foods such as meat and vegetables after the cooking operation has been completed.

Yet another object of the invention is to provide a means to dispose of the surface liquid or fats after a centrifuge operation has been completed in a fast and efficient manner.

Another object of the invention is to provide a lightweight inexpensive centrifugal fat extraction apparatus which is easy to store and economical in design.

Accordingly, it is an objective of the present invention to provide an improved centrifugal fat extraction apparatus which has few moving parts, is affordable, compact, lightweight, and additionally is easy to clean and store. The improvements afforded by this apparatus will be set forth throughout the following description, claims and accompanying drawings.

BRIEF DESCRIPTION OF THE DRAWINGS

The above, as well as other, advantages of the present invention will become readily apparent to those skilled in the art from the following detailed descriptions of the preferred embodiment when considered in light of the accompanying drawings in which.

DESCRIPTION OF THE PREFERRED EMBODIMENTS

Figure 1:
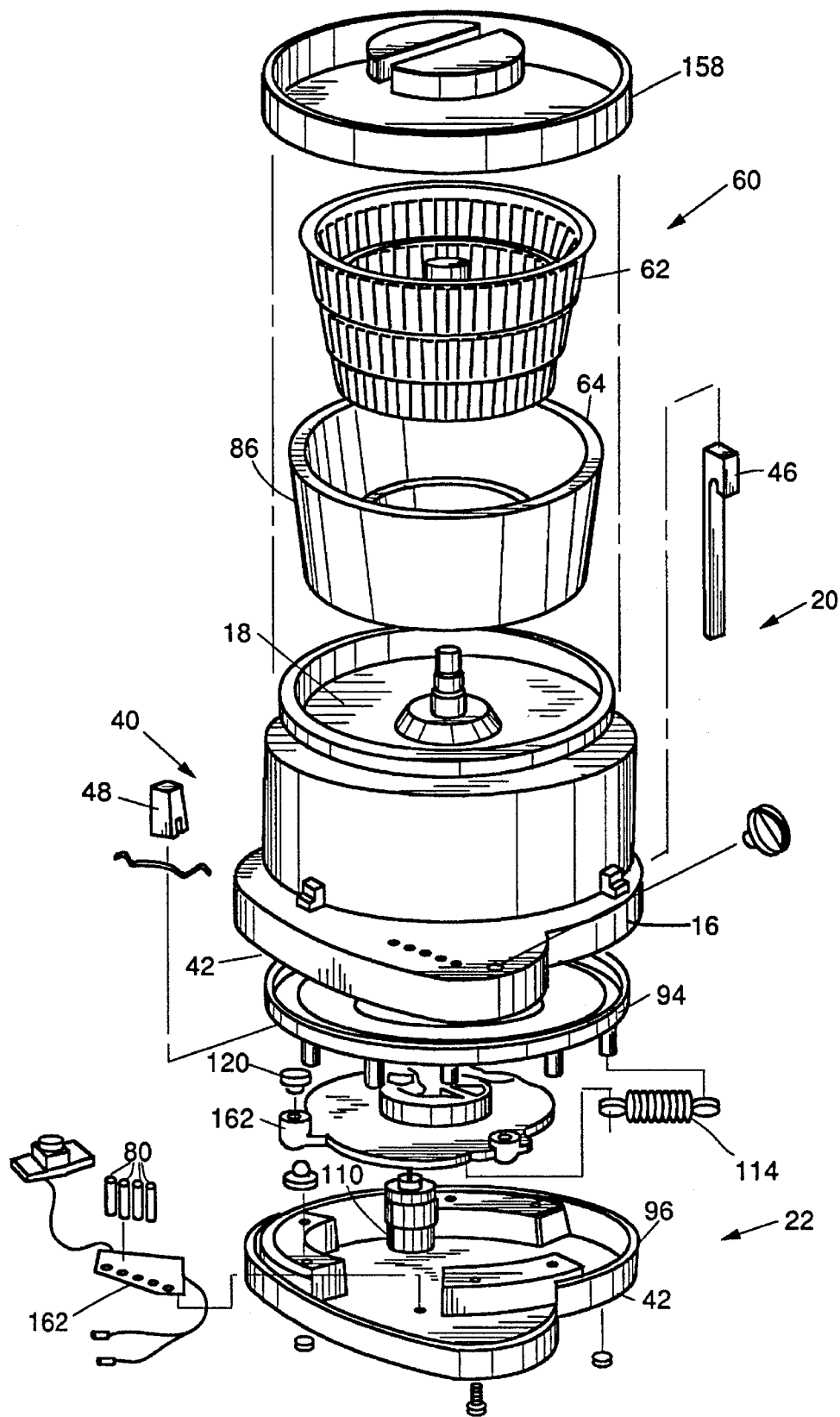
FIG. 1 is an exploded perspective view of the centrifugal fat extraction apparatus in accordance with the present invention.

Referring now to the drawings wherein like reference numerals refer to like and corresponding parts throughout, the centrifugal fat extraction apparatus of the present invention is generally indicated by numeral 20. Referring now to FIG. 1, the centrifugal fat extraction apparatus 20 comprises a housing assembly 40 having an open top end 18 and open bottom end 42 and includes a self-centering drive assembly 22 fixedly mounted to the bottom end 42 and interiorally houses a container assembly 60 for holding the food and catching and retaining the removed surface fluids from the foods during centrifuge. A transparent cover 158 mounts on the top end 18 of the housing assembly 40 wherein a downward force engages a switch means 46 and 48 which actuates the self-centering drive assembly 22 for circular rotation.

Figure 2:
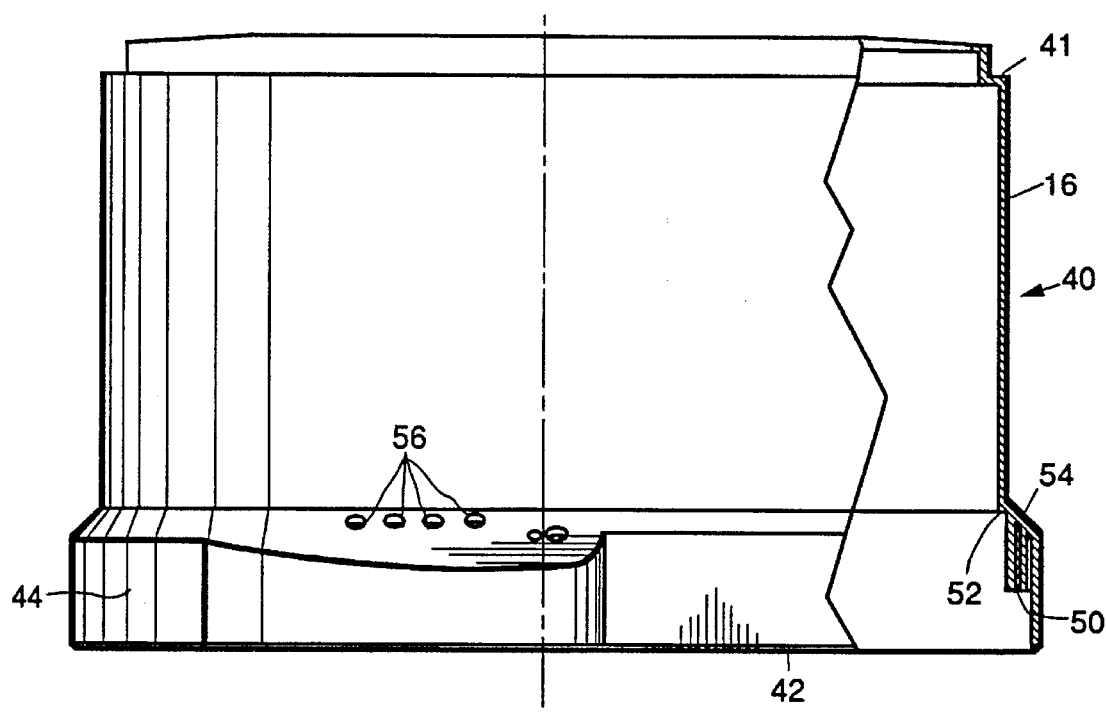
FIG. 2 is a side elevational view, partially broken away, of the cylindrical housing shown in FIG. 1.

Referring now to FIG. 2, the housing assembly 40 comprises a generally cylindrically shaped housing 16 having an annular flange 44 along the bottom end 42 and as shown in FIG. 1 houses the switch means 46 and 48. The annular flange 44 defines interiorally a first annular rim or boss cross-section 50 along the bottom end 42 of cylindrical housing 16 and interiorally a second annular rim 52 located above the first annular rim 50. The first annular rim 50 further defines a plurality of threaded holes 54 for fixably mounting the self-centering drive assembly 22 as will be more fully described below. As shown in FIGS. 1 and 2, along the annular flange 44 is a plurality of apertures 56 which house indicator lights 80 and a control knob aperture 58 for housing the power knob 82.

Figure 3:
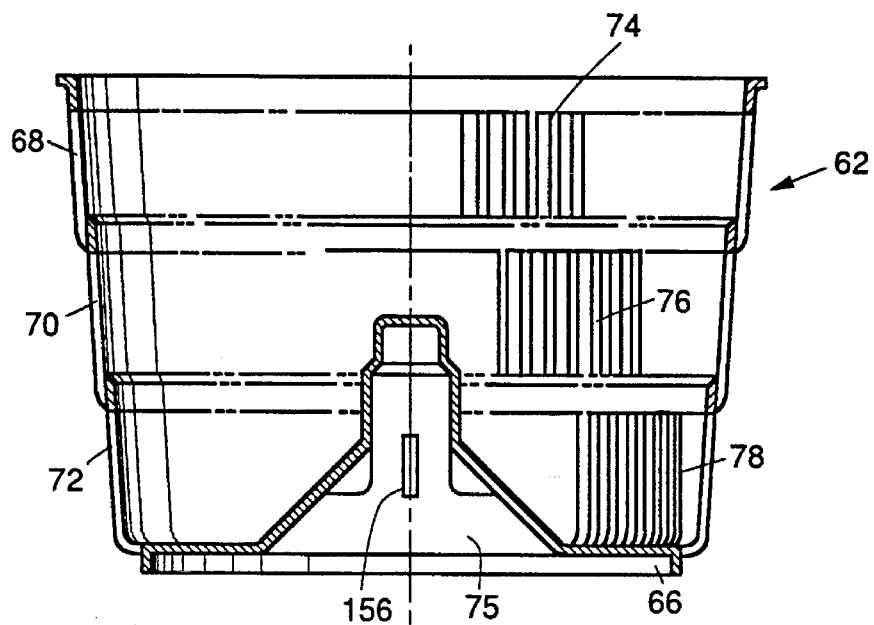
FIG. 3 is a cross-sectional view of the cylindrical slotted basket shown in FIG. 1.
Figure 4:
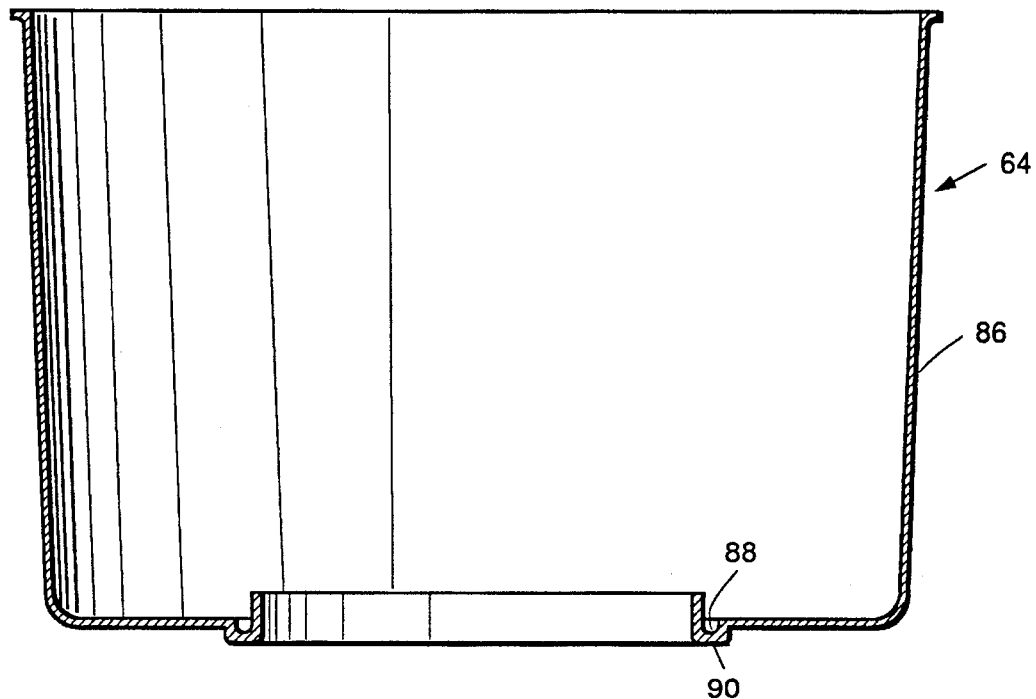
FIG. 4 is a cross-sectional side view of the drum shown in FIG. 1.

Referring to FIGS. 1, 3, and 4, the container assembly 60 comprises a cylindrical slotted basket 62 and a cylindrical drum 64. Referring now to FIG. 3, the cylindrical slotted basket 62 comprises a horizontally disposed circular bottom piece 66 and three interconnected vertically disposed cylindrical portions 68, 70, and 72. The three vertically disposed cylindrical portions, 68, 70, and 72, respectively, have slightly smaller diameters with the top portion 68 having the greatest diameter and the bottom portion 72 having the smallest diameter. Each of the three interconnected vertically disposed cylindrical portions, 68, 70, and 72, respectively, define a plurality of vertical slots 74, 76, and 78. The width of the slots, 74, 76, and 78, respectively must be sufficiently wide to permit the surface liquid from the food to pass through readily, but not so wide as to allow food to pass through or mush. As shown in FIG. 3, the width of the slots 74 are wider than the width of the slots of 76 and 78, and the width of the slots of 76 are slightly wider than the width of the slots of 78. The circular bottom piece 66 of cylindrical slotted basket 62 defines a channel 75 which is sized and shaped to receive and engage a rotatable spindle 84 as shown in FIG. 1 and as will be more fully detailed below.

Referring now to FIG. 4, the drum 64 utilized to catch and retain the removed surface fluids comprises a solid vertical wall 86 for surrounding the vertical walls 68, 70 and 72 of cylindrical slotted basket 62. The solid vertical wall 86 of drum 64 has an annular channel 88 on the inside of its outer lower edge 90 which defines a substantially J-shaped cross section at outer lower edge 90. As shown in FIG. 1, the solid vertical wall 86 of drum 64 is vertically mountable within the cylindrically shaped housing 16 and directly mountable on and removable from the self-centering drive assembly 22. Referring now to FIG. 1, the self-centering drive assembly 22 comprises a motor support plate member 92 housed between a circular bearing plate member 94 and a cup-shaped base member 96.

Figure 5:
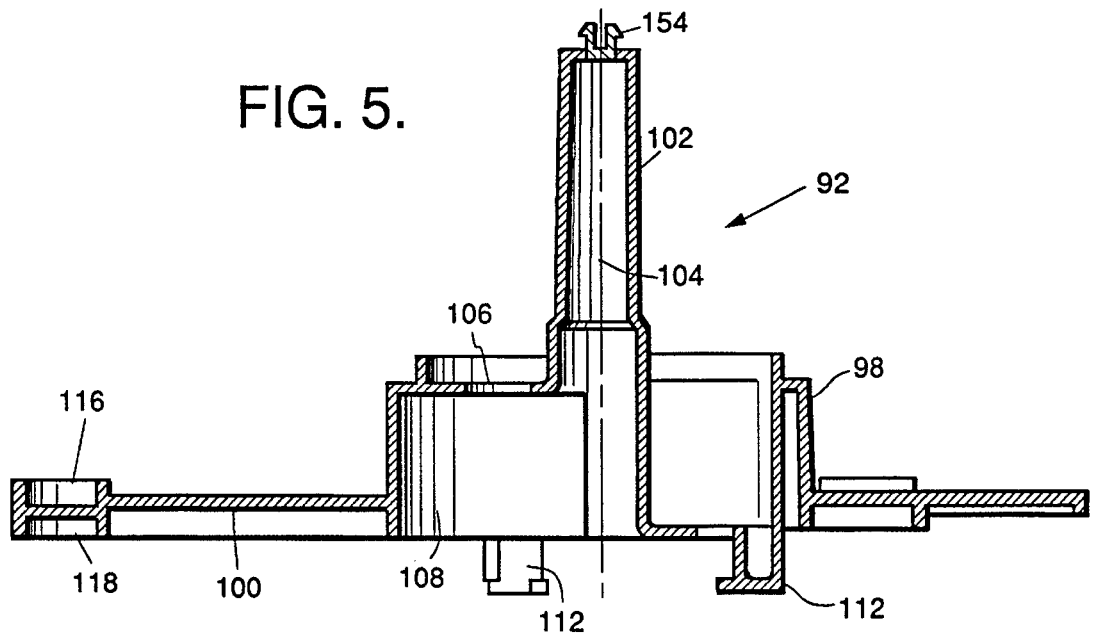
FIG. 5 is a cross-sectional side view of the motor support plate member shown in FIG.

Turning now to FIG. 5, the motor support plate member 92 having a top and bottom surface 98 and 100, defines along a top surface a vertically extending shaft 102 centered along a main drive axis 104. The bottom surface 100 of motor support plate member 92 defines an aperture 106 and cavity 108 for fixedly mounting and receiving a drive motor 110 shown in FIG. 1. Additionally, along the bottom surface 100 of motor support plate member 92 are a plurality of downwardly extending hook-shaped portions 112 for receiving the ends of springs 114 as shown in FIG. 1. Along the outer edge of motor support plate member 92 are a plurality of grooves 116 and 118 defined by the top and bottom surfaces 98 and 100, respectively, for receiving a plurality of glides 120 as will be more fully described below.

Figure 6:
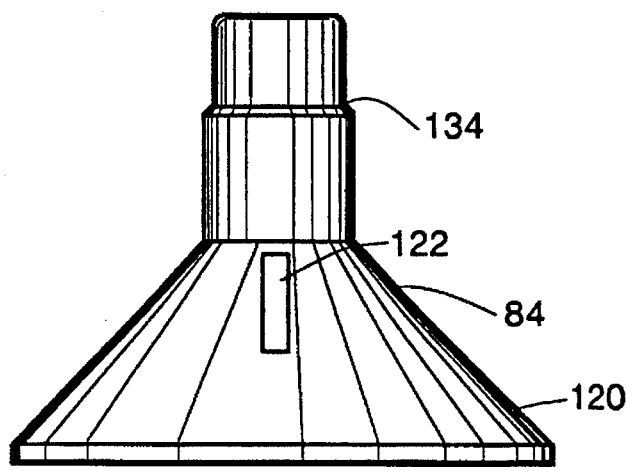
FIG. 6 is a side elevational view of the spindle shown in FIG. 1.
Figure 7:
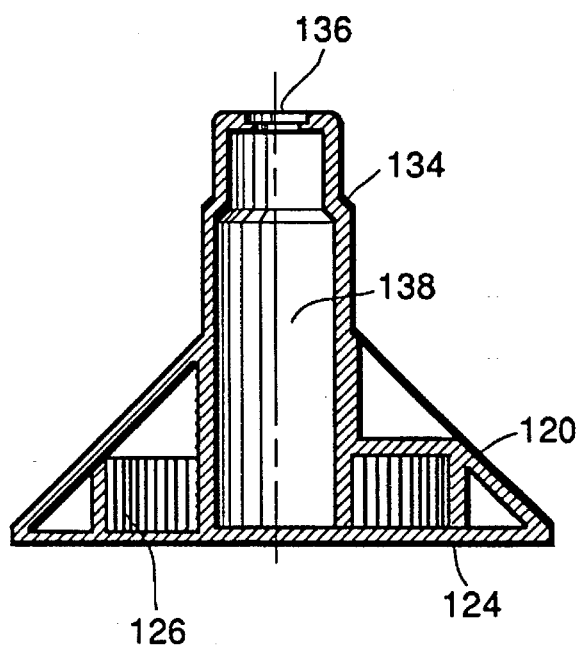
FIG. 7 is a cross-sectional side view of the spindle shown in FIG. 6.

Referring now to FIGS. 6 and 7, the rotatable spindle member 84 for use in association with the drive motor 110 and slotted cylindrical basket 62 comprises an annular flange 120 defining a series of spaced apart raised ridged rectangular segments or depressed slots 122 on an outer periphery at a first end. The flange 120 extends away from and surrounds a central tip 134 which may have a second end defining a first opening 136 therein communicating with a central passageway 138 and terminating in a second opening 124. The central passageway 138 is sized and shaped to be received on vertical shaft 102 of motor support plate member 92. The second opening 124 has a circumferential wall defining a plurality of teeth 126 for use in engagement with the gear teeth of the drive motor 110 as will be more fully detailed below.

Figure 8:
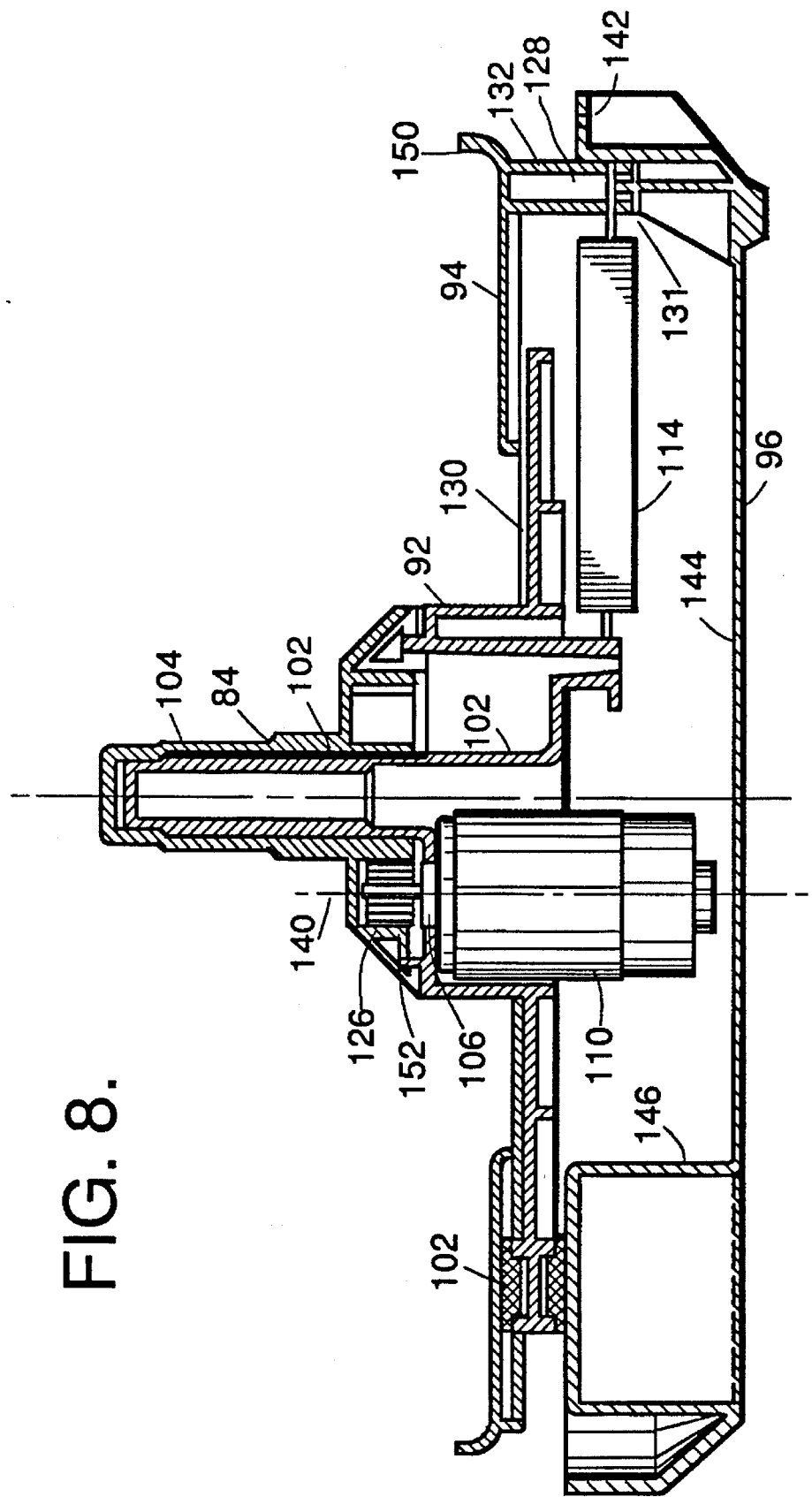
FIG. 8 is a cross-sectional side view of the self-centering drive assembly in accordance with the present invention.

The self-centering drive assembly 22 is shown in FIG. 8 and depicts the assembly of the motor support plate member 92 housed between the circular bearing plate member 94 and the cup-shaped base member 96. The cup-shaped base member 96 defines an outer rim 131 which supports and mounts the circular bearing plate member 94 by bolts not shown bolted into threaded studs 128, or by use of unthreaded spring anchors not shown. The circular bearing plate member 94 further defines a centrally disposed aperture 130 sufficiently wide enough to allow the vertical shaft 102 of motor support plate member 92 to pass through, and allow eccentric movement with sufficient clearance.

Still referring to FIG. 8, the motor support plate member 92 is held horizontally between the circular bearing plate member 94 by a plurality of springs 114. The springs 114 mount to the hook shaped members 112 of motor support plate member 92 at one end and to a downwardly extending member 132 of circular bearing plate member 94. The motor support plate member 92 is held vertically in place between the circular bearing plate member 94 and the cup-shaped base member 96 by glides 102 that rest on top of a plurality of circumferentially upraised portions 146 defined by the floor surface 144 of cup-shaped base member 96 and the bottom surface of circular bearing plate member 94. As shown in FIG. 8, the glides 102 in association with the springs 114 allow the motor support plate member 92 to move in a horizontal direction therefore allowing lateral deflection during engagement of drive motor 110.

As shown in FIG. 8, the motor support plate member 92 fixedly engages the drive motor 110 in a vertical axis 140 offset from the main vertical axis 104 within the aperture 130 of the circular bearing plate member 94. The motor support plate member 92 fixedly engages the drive motor 110 in aperture 106 by attachment means commonly known and used in the art. By way of example, but not of limitation, this could be any type of threaded bolt and washer combination.

Figure 9:
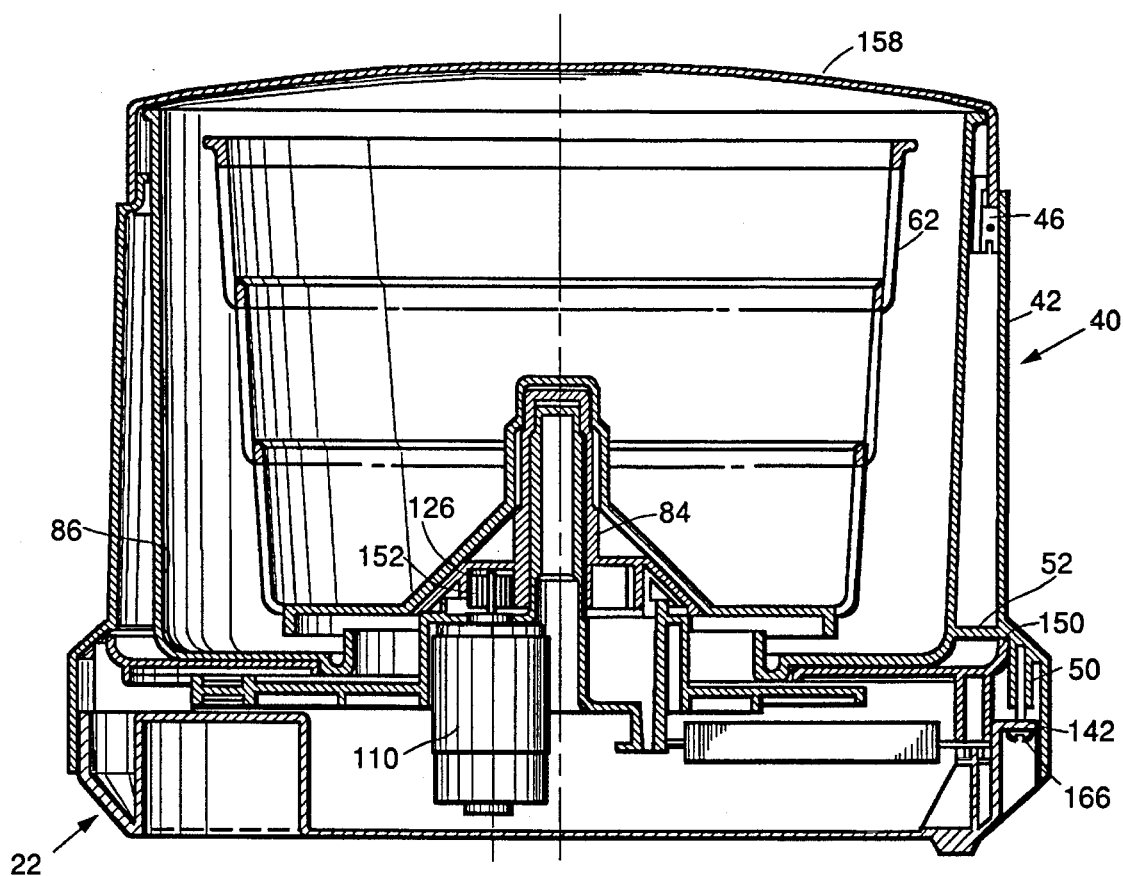
FIG. 9 is a cross-sectional side view of the centrifugal fat extraction apparatus of the present invention.

Referring now to FIG. 9, the self-centering drive assembly 22 is mounted to the cylindrical housing assembly 40 by placement of the first annular rim or bosses 50 of cylindrical housing 42 upon the upwardly extending annular rim or bosses 142 of cup-shaped base member 96 and fastened by bolt or screw 166. The second annular rim 52 of circular housing 42 seats against the upward rim 150 of circular bearing plate member 94.

As shown in FIGS. 5 and 8, the spindle member 84 is placed onto vertical shaft 102 wherein the teeth 126 of spindle member 84 cooperatively engage the drive gear 156 of drive motor 110. Additionally, the spindle member 84 is held in a downward position by the circularly shaped hook member 154 on vertical shaft 102 cooperatively engaging through first opening 136, thereby preventing the spindle member 84 from moving in an upward direction during rotation. There may be other preferable ways for mounting as well.

Referring now to FIG. 9, the drum 86 is placed within the cylindrical housing 42 and the slotted basket 62 is placed onto spindle member 84. Referring now to FIG. 3, the bottom portion 66 of slotted basket 62 defines a cavity 75 having a slot 156 which cooperatively engages the rectangular up-raised portions 122 of spindle member 84, thereby retaining the slotted basket 62 in place during rotation. A transparent cover 158 is now placed over the top of drum 86 and onto the open ended rim 41 of cylindrical housing 42.

In order to operate the centrifugal fat extraction apparatus 20 shown in FIGS. 1 and 9, food is placed into slotted basket 62 which is then inserted vertically downward so that the channel 75 of slotted basket 62 is aligned with vertical shaft 102 and engages spindle member 84. After the basket 62 containing the food product has been mounted into cylindrical housing 42, circular transparent lid 158 is placed over the upper open end 18 of cylindrical housing 42 and mounted on rim 41 to enclose slotted basket 62 within the cylindrical housing 42. Firmly pressing down on lid 158 engages an electrical switch 46 housed within cylindrical housing 42 thereby activating the drive motor 110. The drive motor 110 has a gear ratio such that during operation the rotatable spindle 84 rotates slotted basket 62 at a variable speed between 750 and 1200 rpm for a period of 45 seconds.

As shown in FIG. 1, during operation of the centrifugal fat extraction device 20, electronics 162 turns on a plurality of lights 80 on the outside of cylindrical housing 42 which sequentially turn on to indicate incremental elapsed time, e.g. 15, 30 and 45 seconds of operation thereby indicating to the user that the centrifuge operation has been completed. The user then removes cover 158 and removes the slotted basket 62 wherein the surface liquid from the food has been removed. The user may now remove drum 64 containing the liquids and/or fats that were extracted during the centrifuge operation and dispose of the contents contained along the inner wall of drum 64.

There has been described and illustrated herein an approved centrifuge fat extraction apparatus. Although, more particular embodiments of the invention have described, it is not intended that the invention be limited exactly thereto, as it is intended that the invention be as broad in scope as the art will permit. The forgoing description and drawings will suggest other embodiments and variations within the scope of the claims to those skilled in the art, all of which are intended to be included in the spirit of the invention.

What is claimed is:

1. An apparatus for removing surface liquid from food comprising:

a) a container means for holding the food for circular rotation having perforations therein to allow the surface liquid to be driven away from the food;

b) a self-centering drive means for engaging and driving said container means and inducing an angular velocity to said container means rotatively spinning the food therein and driving the liquid centrifugally away from the food through said perforations in said container means; and c) a housing means for retaining said self-centering drive means and allowing said self-centering drive means a predetermined degree of movement within one plane and perpendicular to a drive means axis and dimensioned to receive said container means and allowing said container means to rotatively move within said housing means in unison with said self-centering drive means, whereby said self-centering drive means and container means being free to move together a predetermined degree in one plane reducing overall movement and vibration of said housing means;

said self-centering drive means comprising a circular bearing plate member having an upwardly extending annular rim and defining a centrally disposed aperture along said drive means axis.

2. An apparatus for removing surface liquid from food according to claim 1, wherein said circular bearing plate member fixedly mounted to a cup-shaped base member having a sidewall and a floor surface, said cup-shaped base member defining a plurality of circumferential upraised portions on said floor surface, said circular bearing plate member positioned onto said circumferential upraised portions of said cup-shaped base member along a bottom surface of said circular bearing plate member.

3. An apparatus for removing surface liquid from food according to claim 2, wherein said housing means comprising a cylindrical housing having an annular flange at a bottom portion and housing a switch means at a top portion, said annular flange defining a first annular rim and a second annular rim on an interior surface, said second annular rim located below said first annular rim, said circular bearing plate member and said cup-shaped member located within said flange of said cylindrical housing with said first annular rim placed upon said upwardly extending annular rim of said circular bearing plate member and said second annular rim fastened to said sidewall of said cup-shaped member.

4. An apparatus for removing surface liquid from food according to claim 3, wherein said self-centering drive means further includes a motor support plate member centrally disposed between said circular bearing plate member and said cup-shaped base member, said circular bearing plate member having a plurality of support means located around an outer edge for association with a top surface of said upraised portions of said cup-shaped base member and connected to said bottom surface of said circular bearing plate member by spring means.

5. An apparatus for removing surface liquid from food according to claim 4, wherein said motor support plate member further defining a vertical shaft centrally disposed within said aperture of said circular bearing plate member and fixedly engaging a drive motor means in a vertical axis offset from said drive means axis within said aperture of said circular bearing plate member.

6. An apparatus for removing surface liquid from food according to claim 5, wherein said vertical shaft of said motor support plate member engages a spindle member having a central concavity to accommodate receipt of said vertical shaft of said motor support plate member, said spindle member defining coupling means on an interior surface engageable with said drive motor means for rotation about said main vertical axis.

7. An apparatus for removing surface liquid from food according to claim 6, wherein said cylindrical housing engages a cylindrical drum member placed within said cylindrical housing defining a centrally disposed aperture along a bottom surface for passage of said vertical shaft of said motor support plate member and said drive motor means, said cylindrical drum member having an annular channel along an edge of said centrally disposed aperture so that it has a substantially J-shaped cross section.

8. An apparatus for removing surface liquid from food according to claim 7, wherein said container means comprising a slotted basket containing the fried food placed within said cylindrical housing and positioned upon said spindle member and being rotatable around said main vertical axis.

9. An apparatus for removing surface liquid from food according to claim 8 wherein said housing means having a solid removable cover for closing an upper open end of said cylindrical housing, wherein a downward force upon said solid removable cover engages said switch means that delivers power to said drive motor means thereby rotating said spindle member and said slotted basket extracting fat from the fried food located within said slotted basket and delivering the fat to said drum member, wherein said motor support plate member will be capable of limited lateral deflection by said spring means to prevent undesirable vibration from being imparted to said cylindrical housing as the result of eccentric loading of the fried foods into said slotted basket.

10. An apparatus for removing surface liquid from food comprising:
   a) a container means for holding the food for circular rotation having perforations therein to allow the surface liquid to be driven away from the food;
   b) a self-centering drive means having a motor support plate member centrally disposed between a circular bearing plate member and a cup-shaped base member for engaging and driving said container means and inducing an angular velocity to said container means rotatively spinning the food therein and driving the liquid centrifugally away from the food through said perforations in said container means; and
   c) a housing means for retaining said self-centering drive means and allowing said self-centering drive means a predetermined degree of movement within one plane and perpendicular to a drive means axis and dimensioned to receive said container means and allowing said container means to rotatively move within said housing means in unison with said self-centering drive means, whereby said self-centering drive means and container means being free to move together a predetermined degree in one plane reducing overall movement and vibration of said housing means.

11. An apparatus for removing surface liquid from food according to claim 10, wherein said circular bearing plate member having an upwardly extending annular rim and defining a centrally disposed aperture along said drive means axis.

12. An apparatus for removing surface liquid from food according to claim 11, wherein said cup-shaped base member having a sidewall and a floor surface, said cup- shaped base member defining a plurality of circumferential upraised portions on said floor surface, said circular bearing plate member positioned onto said circumferential upraised portions of said cup-shaped base member along a bottom surface of said circular bearing plate member.

13. An apparatus for removing surface liquid from food according to claim 12, wherein said housing means comprising a cylindrical housing having an annular flange at a bottom portion and housing a switch means at a top portion, said annular flange defining a first annular rim and a second annular rim on an interior surface, said second annular rim located below said first annular rim, said circular bearing plate member and said cup-shaped member located within said flange of said cylindrical housing with said first annular rim placed upon said upwardly extending annular rim of said circular bearing plate member and said second annular rim fastened to said sidewall of said cup-shape member.

14. An apparatus for removing surface liquid from food according to claim 13, wherein said motor support plate member centrally disposed between said circular bearing plate member and said cup-shaped base member by said circular bearing plate member having a plurality of support means located around an outer edge for association with a top surface of said upraised portions of said cup-shaped base member and connected to said bottom surface of said circular bearing plate member by spring means.

15. An apparatus for removing surface liquid from food according to claim 14, wherein said motor support plate member further defining a vertical shaft centrally disposed within said aperture of said circular bearing plate member and fixedly engaging a drive motor means in a vertical axis offset from said drive means axis within said aperture of said circular bearing plate member.

16. An apparatus for removing surface liquid from food according to claim 15, wherein said vertical shaft of said motor support plate member engages a spindle member having a central concavity to accommodate receipt of said vertical shaft of said motor support plate member, said spindle member defining coupling means on an interior surface engageable with said drive motor means for rotation about said main vertical axis.

17. An apparatus for removing surface liquid from food according to claim 16, wherein said cylindrical housing engages a cylindrical drum member placed within said cylindrical housing defining a centrally disposed aperture along a bottom surface for passage of said vertical shaft of said motor support plate member and said drive motor means, said cylindrical drum member having an annular channel along an edge of said centrally disposed aperture so that it has a substantially J-shaped cross section.

18. An apparatus for removing surface liquid from food according to claim 17, wherein said container means comprising a slotted basket containing the fried food placed within said cylindrical housing and positioned upon said spindle member and being rotatable around said main vertical axis.

19. An apparatus for removing surface liquid from food according to claim 17, wherein said housing means having a solid removable cover for closing an upper open end of said cylindrical housing, wherein a downward force upon said solid removable cover engages said switch means that delivers power to said drive motor means thereby rotating said spindle member and said container means extracting fat from the fried food located within said container means and delivering the fat to said drum member, wherein said motor support plate member will be capable of limited lateral deflection by said spring means to prevent undesirable vibration from being imparted to said cylindrical housing as the result of eccentric loading of the fried foods into said container means.

20. An apparatus for extracting the fat content from fried foods comprising:
   a) a circular bearing plate member having an upwardly extending annular rim and defining a centrally disposed aperture along a main vertical axis;
   b) a cup-shaped base member having a sidewall and a floor surface, said cup-shaped base member defining a plurality of circumferential upraised portions on said floor surface, said circular bearing plate member fixedly mounted to said circumferential upraised portions of said cup-shaped base member along a bottom surface of said circular bearing plate member;
   c) a cylindrical housing having an annular flange at a bottom portion and housing a switch means at a top portion, said annular flange defining a first annular rim and a second annular rim on an interior surface, said second annular rim located below said first annular rim, said circular bearing plate member and said cup-shaped member located within said flange of said cylindrical housing with said first annular rim placed upon said upwardly extending annular rim of said circular bearing plate member and said second annular rim fastened to said sidewall of said cup-shaped member;

d) a motor support plate member centrally disposed between said circular bearing plate member and said cup-shaped base member, said circular bearing plate member having a plurality of support means located around an outer edge for association with a top surface of said upraised portions of said cup-shaped base member and connected to said bottom surface of said circular bearing plate member by spring means;

e) said motor support plate member further defining a vertical shaft centrally disposed within said aperture of said circular bearing plate member and fixedly engaging a drive motor means in a vertical axis offset from said main vertical axis within said aperture of said circular bearing plate member;

f) a spindle member having a central concavity to accommodate receipt of said vertical shaft of said motor support plate member, said spindle member defining coupling means on an interior surface engageable with said drive motor means for rotation about said main vertical axis;

g) a cylindrical drum member placed within said cylindrical housing defining a centrally disposed aperture along a bottom surface for passage of said vertical shaft of said motor support plate member and said drive motor means, said cylindrical drum member having an annular channel along an edge of said centrally disposed aperture so that it has a substantially J-shaped cross section;

h) a slotted basket containing the fried food placed within said cylindrical housing and positioned upon said spindle member and being rotatable around said main vertical axis; and i) a solid removable cover for closing an upper open end of said cylindrical housing, wherein a downward force upon said solid removable cover engages said switch means that delivers power to said drive motor means thereby rotating said spindle member and said slotted basket extracting fat from the fried food located within said slotted basket and delivering the fat to said drum member, wherein said motor support plate member will be capable of limited lateral deflection by said spring means to prevent undesirable vibration from being imparted to said cylindrical housing as the result of eccentric loading of the fried foods into said slotted basket.

* * * * *